United States Patent
Smith

(10) Patent No.: US 7,992,028 B2
(45) Date of Patent: Aug. 2, 2011

(54) POWER MANAGEMENT FOR CORRELATING DIFFERENCE IN SYSTEM POWER MEASUREMENTS WITH SUBSYSTEM POWER DRAW

(75) Inventor: David E. Smith, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1361 days.

(21) Appl. No.: 11/502,299

(22) Filed: Aug. 10, 2006

(65) Prior Publication Data
US 2008/0040621 A1    Feb. 14, 2008

(51) Int. Cl.
*G06F 1/26* (2006.01)
(52) U.S. Cl. ........... 713/340; 358/1.15; 702/61; 702/65; 713/300
(58) Field of Classification Search .................... 324/74; 702/61, 65; 358/1.15; 713/300, 340
See application file for complete search history.

(56) References Cited

U.S. PATENT DOCUMENTS

| | | | |
|---|---|---|---|
| 5,515,087 A | 5/1996 | Lim et al. | |
| 5,563,635 A | 10/1996 | Kneezel et al. | |
| 6,055,068 A | 4/2000 | Abe et al. | |
| 6,386,674 B1 | 5/2002 | Corrigan, III et al. | |
| 6,393,233 B1 | 5/2002 | Soulier | |
| 7,289,745 B2 * | 10/2007 | Nara et al. | 399/88 |
| 7,536,573 B2 * | 5/2009 | Schumacher et al. | 713/320 |
| 7,536,577 B2 * | 5/2009 | Desai et al. | 713/340 |
| 7,584,371 B2 * | 9/2009 | Zhang | 713/310 |
| 2003/0110405 A1 | 6/2003 | Ryu | |
| 2004/0187042 A1 | 9/2004 | Kawanabe | |
| 2004/0246512 A1 | 12/2004 | Miyamoto | |
| 2005/0088466 A1 | 4/2005 | Smith et al. | |
| 2005/0278556 A1 | 12/2005 | Smith et al. | |

FOREIGN PATENT DOCUMENTS

JP            07063829 A  *  3/1995

* cited by examiner

*Primary Examiner* — Albert Wang

(57) ABSTRACT

Embodiments of power management are disclosed.

19 Claims, 3 Drawing Sheets

POWER MANAGEMENT FOR CORRELATING DIFFERENCE IN SYSTEM POWER MEASUREMENTS WITH SUBSYSTEM POWER DRAW

BACKGROUND

Imaging devices have a number of alternating current (AC) and direct current (DC) powered subsystems such as vacuum blower systems, aerosol collection systems, media dryers, etc. To avoid inadvertent over-power shutdown of the imaging device or a particular subsystem, the power consumed by the various subsystems of the imaging device may be managed. However, monitoring each subsystem's power consumption is costly.

BRIEF DESCRIPTION OF THE DRAWINGS

For a more complete understanding of the present disclosure and the advantages thereof, reference is now made to the following descriptions taken in connection with the accompanying drawings in which.

DETAILED DESCRIPTION OF THE DRAWINGS

Figure 1:
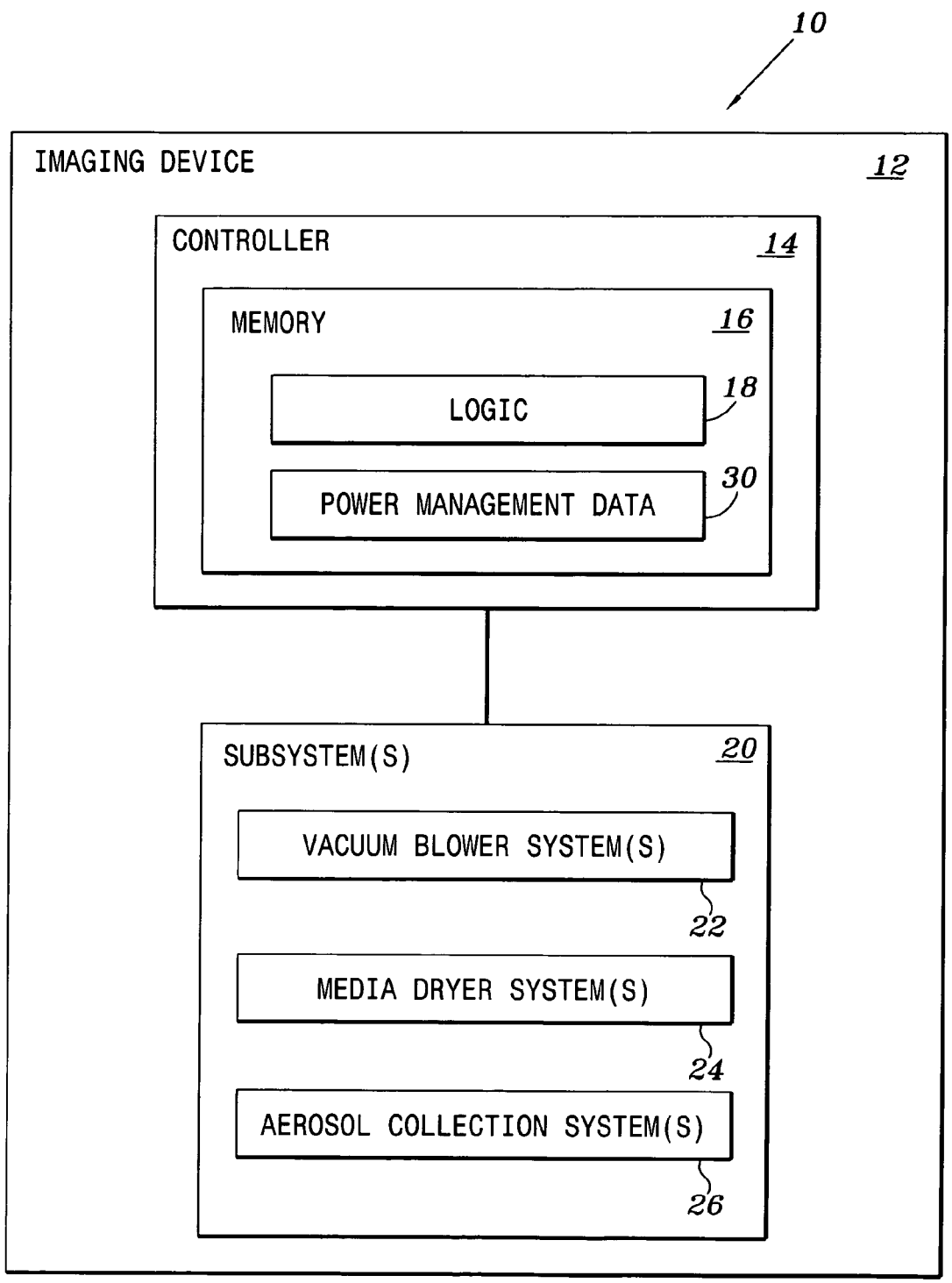
FIG. 1 is a diagram illustrating an embodiment of a power management system in accordance with one embodiment of the present disclosure.
Figure 2:
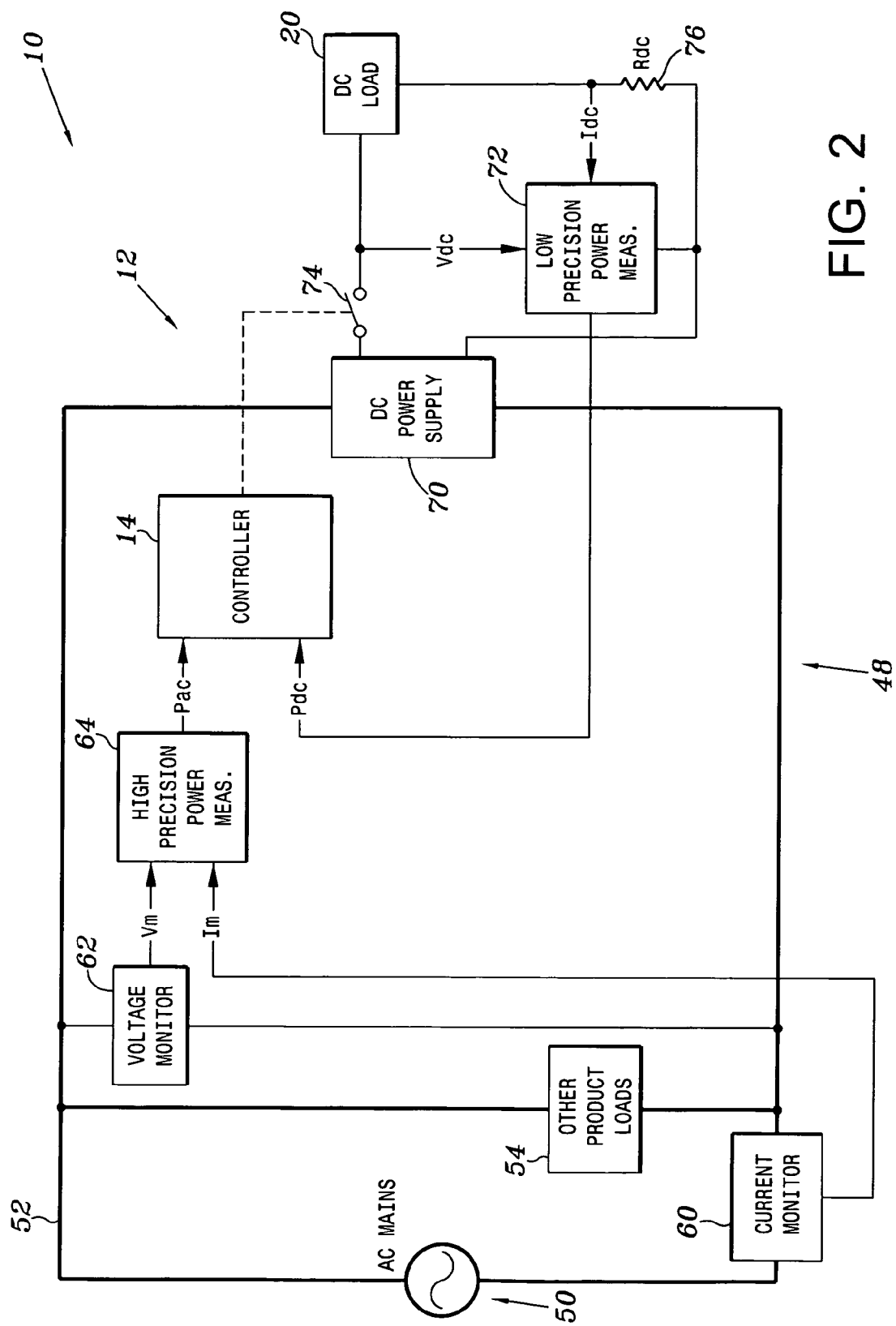
FIG. 2 is a circuit diagram illustrating an embodiment of a power management system in accordance with one embodiment of the present disclosure.
Figure 3:
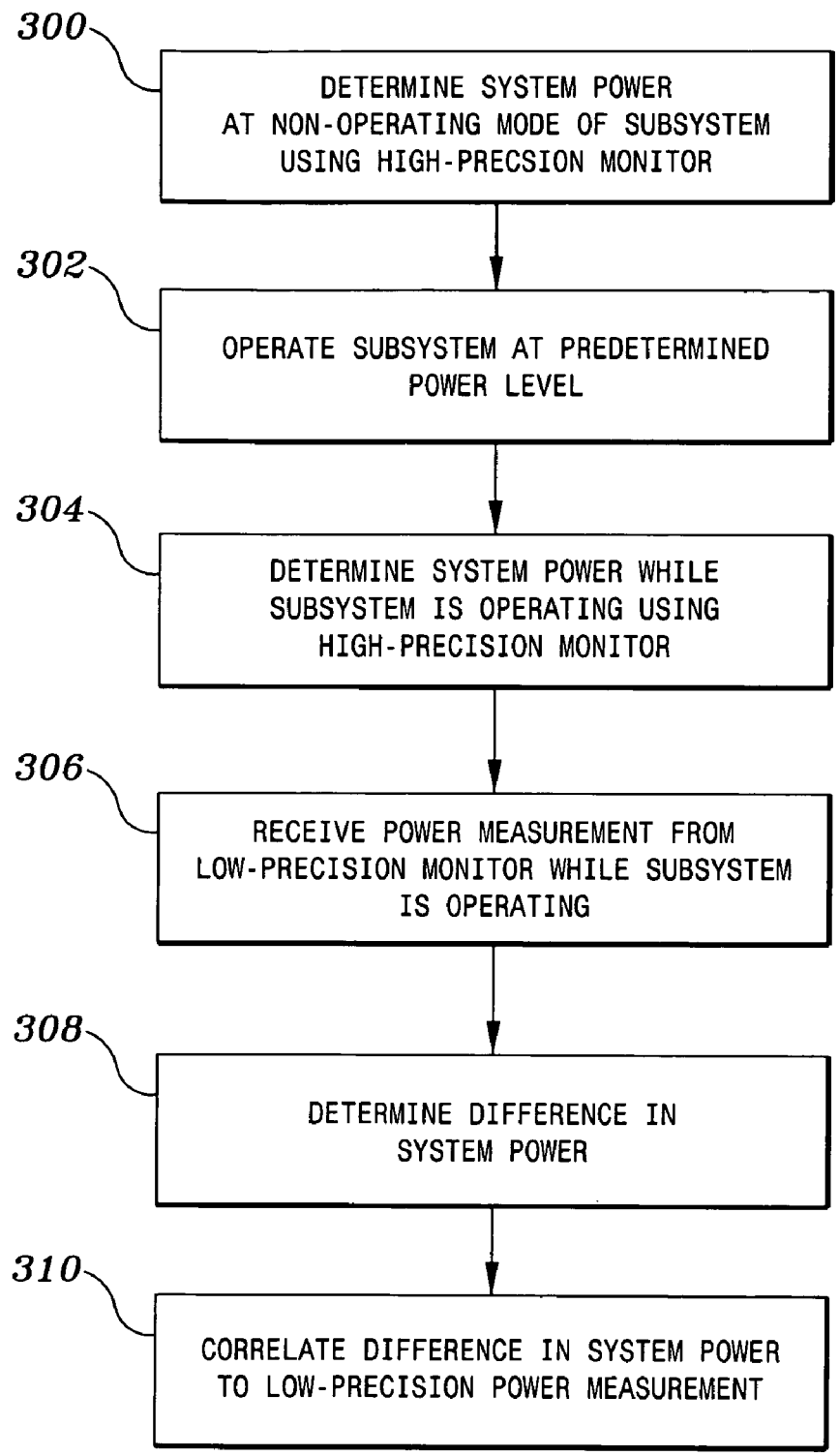
FIG. 3 is a flow diagram illustrating an embodiment of a power management method in accordance with one embodiment of the present disclosure.

Embodiments of the present disclosure and the advantages thereof are best understood by referring to FIGS. 1-3 of the drawings, like numerals being used for like and corresponding parts of the various drawings.

FIG. 1 is a diagram illustrating an embodiment of a power management system 10 in accordance with the present disclosure. In the embodiment illustrated in FIG. 1, system 10 is implemented in an imaging device 12. Imaging device 12 may comprise any type of device for imaging an object or document such as, but not limited to, a scanner, copier, facsimile device, or multi-function imaging device. However, it should be understood that embodiments of the present disclosure may be implemented in devices other than imaging devices.

In the embodiment illustrated in FIG. 1, imaging device 12 comprises a controller 14 having an embedded processor and a non-volatile memory 16. Controller 14 may comprise hardware, software, firmware, or a combination thereof. In FIG. 1, memory 16 is illustrated as forming part and/or otherwise embodied within controller 14. However, it should be understood that memory 16 may comprise a memory component separate and apart from controller 14. In one embodiment, controller 14 is configured to execute control logic 18 in the form of executable instructions to carry out various control or management functions associated with imaging device 12. For example, in the embodiment illustrated in FIG. 1, controller 14 is configured to control and/or manage various functions associated with subsystem(s) 20 of imaging device 12. In FIG. 1, subsystem(s) 20 comprise vacuum blower system(s) 22, media dryer system(s) 24 and aerosol collection system(s) 26. However, it should be understood that additional and/or different subsystem(s) 20 may reside and/or otherwise form part of imaging device 12. Further, it should be understood that each subsystem 20 may comprise a single component or a combination of components.

In the embodiment illustrated in FIG. 1, memory 16 comprises power measurement data 30 stored therein. Power measurement data 30 comprises information associated with power levels and/or measurements associated with imaging device 12. For example, in some embodiments of the present disclosure, power measurement data 30 comprises information associated with power available from one or power sources (e.g., an alternating current (AC) main), power available to and/or otherwise consumed by one or more subsystems (20), information associated with different operating power levels for different subsystems 20, historical power measurement data corresponding to one or more subsystems 20, etc. However, it should be understood that power measurement data may comprise other types of information associated with power measurements and/or control.

FIG. 2 is a diagram illustrating an embodiment of a precision power measurement circuit 48 of power management system 10 in accordance with the present disclosure. In the embodiment illustrated in FIG. 2, circuit 48 comprises an AC power source 50 and a line 52 for conveying power to subsystem 20 and to various other component loads (indicated generally by arrow 54) of imaging device 12. However, it should be understood that in other embodiments of the present disclosure, power source 50 may instead comprise a DC power source.

In the embodiment illustrated in FIG. 2, circuit 48 also comprises a current monitor 60, a voltage monitor 62, a high-precision power monitor 64, controller 14, an AC/DC converter 70, and a low-precision power monitor 72. High-precision power monitor 64 is generally configured to comprise a power measurement device capable of providing an accuracy measurement of approximately +/−0.1%. Low-precision power monitor 72 is generally configured to comprise a power measurement device capable of providing an accuracy measurement of approximately +/−1%-5%. In FIG. 1, a single low-precision power monitor 72 is illustrated as being associated with subsystem 20. However, it should be understood that multiple low-precision power monitors 72 may be associated with and/or otherwise coupled to a single subsystem 20 for measuring power for different components and/or subassemblies of a single subsystem 20. Further, in FIG. 2, a single subsystem 20 is illustrated as providing a power measurement to controller 14 via low-precision power monitor 72. However, it should be understood that controller 14 may receive low-precision power measurements from multiple low-precision power monitors 72 associated with either a single subsystem 20 or multiple subsystems 20.

In the embodiment illustrated in FIG. 2, controller 14 is used to determine with a high level of precision an amount of power consumed by subsystem 20 based in part on a low-precision power measurement provided by low-precision power monitor 72. In the embodiment illustrated in FIG. 2, power source 50 comprises an AC power source, and subsystem 20 comprises a DC-powered subsystem such that AC/DC converter 70 converts the AC supply power to a desired level of DC power supply to subsystem 20. However, it should be understood that embodiments of the present disclosure are not limited to the AC/DC power arrangement illustrated in FIG. 2. For ease of illustration and description of one embodiment of the present disclosure, however, the embodiment illustrated in FIG. 2 will be described as having an AC power source 50 and a DC-powered subsystem 20.

In operation, current monitor 60 is used to measure the total overall current being used by the device 12, indicated by $I_m$ in FIG. 2. Current monitor 60 may comprise an analog and/or an analog-to-digital component including, but not limited to, a low-ohm resistor. Voltage monitor 62 is used to measure the voltage of the total power available to device 12 from power source 50, indicated by $V_m$ in FIG. 2. Voltage monitor 62 may comprise analog and/or an analog-to-digital components such a resistors, op-amps, and the like. As illustrated in FIG. 2, the overall current being used by device 12 and the voltage measurement of the power available by power supply 50 are provided and/or otherwise received by high-precision power monitor 64. These measurements are used by high-precision power monitor 64 to identify and/or otherwise determine the power used in device 12, indicated by $P_{ac}$ in FIG. 2, based upon the formula P=IV.

In FIG. 2, low-precision power monitor 72 is used to measure a level of power used or consumed by subsystem 20 during operation of subsystem 20. For example, in the embodiment illustrated in FIG. 2, low-precision power monitor 72 measures an amount of voltage received and/or supplied from AC/DC converter 70 to subsystem 20, indicated by $V_{dc}$ in FIG. 2, and an amount of current being used by subsystem 20 during operation of subsystem 20 (e.g., using a low-ohm resistor 76), indicated by $I_{dc}$ In FIG. 2. Thus, low-precision power monitor 72 determines the power used by subsystem 20 while subsystem 20 is being operated, indicated by $P_{dc}$ in FIG. 2, based upon the formula P=IV. $P_{dc}$ is communicated by low-precision power monitor 72 to controller 14.

In the embodiment illustrated in FIG. 2, controller 14 is used to control different operational modes of subsystem 20. For example, controller 14 may be used to cycle subsystem 20 between a non-operating mode and an operating mode. In some embodiments of the present disclosure, controller 14 is further configured to operate subsystem 20 at one or more different power levels. In FIG. 2, controller 14 is configured to actuate and de-actuate a switch 74 for controlling operation of subsystem 20. However, it should be understood that other devices or methods may be used to control operation of subsystem 20.

In operation, controller 14 is used to isolate a particular subsystem 20 to determine a functional relationship between a high-precision power measurement and a low-precision power measurement for the isolated subsystem 20. For example, in the embodiment illustrated in FIG. 2, the subsystem 20 illustrated in FIG. 2 is isolated and evaluated while other subsystems 20 of device 12 are maintained in a non-operating mode. However, it should be understood that even while other subsystems 20 are maintained in a non-operating mode, a particular amount of power is being consumed by, for example, controller 14 and other component loads 54. In operation, for the selected subsystem 20, current monitor 60 measures and reports the value $I_m$ to high-precision power monitor 64, and voltage monitor 62 measures and reports the value $V_m$ to high-precision power monitor 64. High-precision power monitor 64 determines the overall AC power $P_{ac}$ for device 12 and provides the $P_{ac}$ power measurement to controller 14. Further, controller 14 obtains and/or records the power measurement $P_{ac}$ while subsystem 20 is operated at at least two different operating modes. For example, in some embodiments of the present disclosure, the power measurement $P_{ac}$ is determined and/or recorded while subsystem 20 is first in a non-operating mode, and another power measurement $P_{ac}$ is determined and/or recorded while subsystem 20 is being operated. Additionally, while subsystem 20 is being operated, the power measurement $P_{dc}$ is recorded and/or otherwise logged by controller 14 indicating the DC power draw of subsystem 20. Controller 14 computes the difference between the two power measurement values $P_{ac}$ to isolate how much AC power draw is attributable to subsystem 20. For example, controller 14 is configured to compute a difference between the two power measurement values $P_{ac}$ (e.g., one while operating and one while not operating) and correlate the difference to the power measurement $P_{dc}$ measured by low-precision power monitor 72. Thus, embodiments of the present disclosure are used to cyclically operate subsystem 20 to determine a functional relationship between a level of AC power attributable to subsystem 20 as measured using a high-precision power monitor (i.e., high-precision power monitor 64) to a measurement of power obtained using a low-precision power monitor (i.e., low-precision power monitor 72), thereby calibrating the low-precision power monitor measurements to a high-precision value. Further, embodiments of the present disclosure also correlate a DC power measurement associated with subsystem 20 to an AC measurement of power attributable to subsystem 20.

In the example described above, two power measurements $P_{ac}$ are used to define a functional relationship between an AC power level measured using a high-precision monitor to a value obtained using a low-precision monitor. However, it should be understood that a greater number of power measurements may be obtained and/or used to define a more complete or accurate functional relationship between the $P_{ac}$ measurements and the $P_{dc}$ measurements. For example, in some embodiments of the present disclosure, $P_{ac}$ and $P_{dc}$ values may be obtained and/or otherwise logged and evaluated while operating subsystem 20 at different power levels. Thus, the additional power measurement values $P_{ac}$ and $P_{dc}$ may be used to define a more complete relationship between high-precision power measurements and low-precision power measurements.

Additionally, the power measurements associated with subsystem 20 (e.g., the $P_{dc}$ measurements) may be historically recorded and/or tracked over time to enable failure prediction and/or wear analysis of subsystem 20. For example, in some embodiments of the present disclosure, the power measurements associated with subsystem 20 using low-precision power monitor 72 are recorded and/or logged by controller 14 over time, thereby providing a statistical analysis to be performed. Thus, in operation, as blowers and other types of subsystems 20 and/or subsystem 20 components wear or deteriorate (e.g., due to normal wear-and-tear, contaminants, etc.), more power is consumed by the subsystem 20. Accordingly, analyzing the power measurements over time facilitates wear and/or failure prediction and analysis (e.g., the rate of wear).

FIG. 3 is a flow diagram illustrating an embodiment of a power management method in accordance with the present disclosure. The method begins at block 300, where high-precision power monitor 64 determines power measurement $P_{ac}$ while subsystem 20 is maintained in a non-operating mode and reports the $P_{ac}$ measurement to controller 14. At block 302, controller 14 is used to operate subsystem 20 at a predetermined power level. At block 304, high-precision power monitor 64 determines power measurement $P_{ac}$ while subsystem 20 is operated at the predetermined power level and reports the operating $P_{ac}$ measurement to controller 14. At block 306, controller 14 receives and/or logs a power measurement $P_{dc}$ corresponding to subsystem 20 measured using low-precision power monitor 72 while subsystem 20 is operated at the predetermined power level. At block 308, controller 14 determines a difference between the value $P_{ac}$ for the non-operating mode of subsystem 20 and the value $P_{ac}$ for the operating mode of subsystem 20. At block 310, controller 14 correlates the difference in power measurements $P_{ac}$ to the power measurement $P_{dc}$ measured and/or reported by low-precision power monitor 72, thereby correlating a high-precision power measurement to a measurement obtained using a low-precision monitor.

Thus, embodiments of the present disclosure enable low-cost low-precision power monitors to be used throughout device 12 at the subsystem level (as opposed to high cost high-precision monitors) while calibrating the low-precision power monitors to high-precision values. Thus, embodiments of the present disclosure enable power monitoring of multiple subsystems 20 at a high level of precision using low-precision monitors (which is significantly less costly than monitoring using high-precision sensors for each subsystem). Further, embodiments of the present disclosure enable correlating a DC power consumption associated with a particular subsystem 20 to an AC power level. Thus, embodiments of the present disclosure establish a correlation of a low-precision sensor power measurement to a high-precision sensor power measurement, thereby enabling a determination of a subsystem's power with a high level of precision.

What is claimed is:

1. A power management system, comprising:
an imaging device having at least one subsystem configured to operate using direct current (DC) power; and
a controller configured to correlate the DC power draw of the at least one subsystem to an amount of alternating current (AC) power draw attributable to the at least one subsystem,
wherein the controller is configured to subtract an amount of AC power measured during operation of the at least one subsystem from an amount of AC power measured without operation of the at least one subsystem to determine the AC power draw attributable to the at least one subsystem.

2. The system of claim 1, wherein the controller is configured to cyclically operate the at least one subsystem to determine the AC power draw attributable to the at least one subsystem.

3. The system of claim 1, further comprising a power monitor to determine an amount of DC current consumed by the at least one subsystem and an amount of DC voltage available to the at least one subsystem.

4. The system of claim 1, wherein the controller is configured to log historical information corresponding to the AC power draw attributable to the at least one subsystem.

5. The system of claim 1, further comprising a low-precision power monitor to determine the DC power draw of the at least one subsystem.

6. The system of claim 1, wherein the controller is configured to determine the AC power draw attributable to the at least one subsystem based on a plurality of different operating DC power levels of the at least one subsystem.

7. A power management system, comprising:
a controller to receive from a high-precision power monitor at least two power measurements each obtained at a different operating mode of a subsystem, the controller configured to correlate a difference between the at least two power measurements to a measurement of power received from a low-precision power monitor associated with the subsystem.

8. The system of claim 7, wherein at least one of the different operating modes comprises a non-operating mode.

9. The system of claim 7, wherein the controller is configured to log historical information corresponding to a power draw attributable to the subsystem.

10. The system of claim 7, wherein the two different operating modes comprises at least two different operating power levels of the subsystem.

11. The system of claim 7, wherein the controller is configured to correlate the difference to a measurement of power received from the low-precision power monitor at least one of the two different operating modes.

12. The system of claim 7, wherein the at least two power measurements comprise at least two different alternating current (AC) power measurements.

13. The system of claim 12, wherein the measurement of power received from the low-precision power monitor comprises a direct current (DC) power measurement.

14. A power management method, comprising:
receiving from a high-precision power monitor at least two power measurements each associated with a different operating mode of a subsystem; and
correlating a difference between the at least two power measurements to a measurement of power received from a low-precision power monitor associated with the subsystem.

15. The method of claim 14, further comprising logging historical information corresponding to a power draw attributable to the subsystem.

16. The method of claim 14, further comprising receiving the at least two power measurements from the high precision monitor at least two different operating power levels of the subsystem.

17. The method of claim 14, further comprising receiving at least one of the two power measurements from the high precision monitor at a non-operating mode of the subsystem.

18. The method of claim 14, wherein receiving the at least two power measurements from the high precision monitor comprises receiving at least two alternating current (AC) power measurements.

19. The method of claim 18, further comprising correlating a different between the at least two AC power measurements to a direct current (DC) power measurement received from the low-precision power monitor.

* * * * *

UNITED STATES PATENT AND TRADEMARK OFFICE
CERTIFICATE OF CORRECTION

| | | |
|---|---|---|
| PATENT NO. | : 7,992,028 B2 | Page 1 of 1 |
| APPLICATION NO. | : 11/502299 | |
| DATED | : August 2, 2011 | |
| INVENTOR(S) | : David E. Smith | |

It is certified that error appears in the above-identified patent and that said Letters Patent is hereby corrected as shown below:

In column 6, line 18, in Claim 11, after "at" delete "least".

In column 6, line 39, in Claim 16, delete "monitor at least" and insert -- monitor at at least --, therefor.

In column 6, line 49, in Claim 19, delete "different between" and insert -- difference between --, therefor.

Signed and Sealed this
Twenty-first Day of February, 2012

David J. Kappos
*Director of the United States Patent and Trademark Office*